United States Patent [19]

Forester et al.

[11] Patent Number: 4,541,608
[45] Date of Patent: Sep. 17, 1985

[54] HIGH PRESSURE SHUT-OFF VALVE

[75] Inventors: Buford G. Forester, Houston; Billy L. Redmon, Pasadena, both of Tex.

[73] Assignee: Custom Oilfield Products, Inc., Houston, Tex.

[21] Appl. No.: 542,669

[22] Filed: Oct. 17, 1983

Related U.S. Application Data

[63] Continuation-in-part of Ser. No. 327,331, Dec. 4, 1981, Pat. No. 4,433,827.

[51] Int. Cl.$^4$ .............................................. F16K 31/44
[52] U.S. Cl. ..................................... 251/77; 251/191; 251/197; 251/200; 251/266; 251/270
[58] Field of Search ................. 251/77, 191, 195, 197, 251/200, 266, 270

[56] References Cited

U.S. PATENT DOCUMENTS

| | | | |
|---|---|---|---|
| 2,331,557 | 10/1943 | Lorehn | 251/191 |
| 2,385,463 | 9/1945 | Penick | 251/197 X |
| 2,552,991 | 5/1951 | McWhorter | 251/191 U X |
| 2,930,577 | 3/1960 | Bredtschneider | 251/200 |
| 3,314,442 | 4/1967 | Volpin | 251/197 X |
| 3,409,271 | 11/1968 | Kallenbach | 251/266 X |
| 4,314,688 | 2/1982 | Leman | 251/191 |
| 4,359,203 | 11/1982 | Cho | 251/77 |

*Primary Examiner*—Harold W. Weakley
*Attorney, Agent, or Firm*—Neal J. Mosely

[57] ABSTRACT

A high pressure shut-off valve has a hollow valve body with an open end, closed end and a cylindrical cavity with a cover. Aligned inlet and outlet portions form a straight bore intersecting the valve cavity. A plug valve assembly has a supporting mandrel reciprocally slidable to a position abutting the valve cavity closed end, with an end portion having a transverse valve passage and an intermediate portion for closing the valve body bore, the valve passage being aligned with the bore when retracted. An elastomeric sealing sleeve member on the mandrel seals the cavity wall around the bore when the valve is closed. A mon-rising threaded stem, operated by a hand wheel, moves the valve assembly and has a lost motion connection operable on overtravel to compress the sleeve member longitudinally along the mandrel. Metal discs supported integrally on a supporting sleeve fill holes in the sleeve member to prevent extrusion of the sleeve into the bore. A pressure release passage bleeds line pressure to the cavity above the sleeve member when in the valve closed position. In an alternate embodiment, the elastomeric sleeve member is molded in a circumferential recess in the mandrel and is constructed to have portions thereof extrude outward to compress a sealing ring portion against the wall of the cavity bore.

18 Claims, 21 Drawing Figures

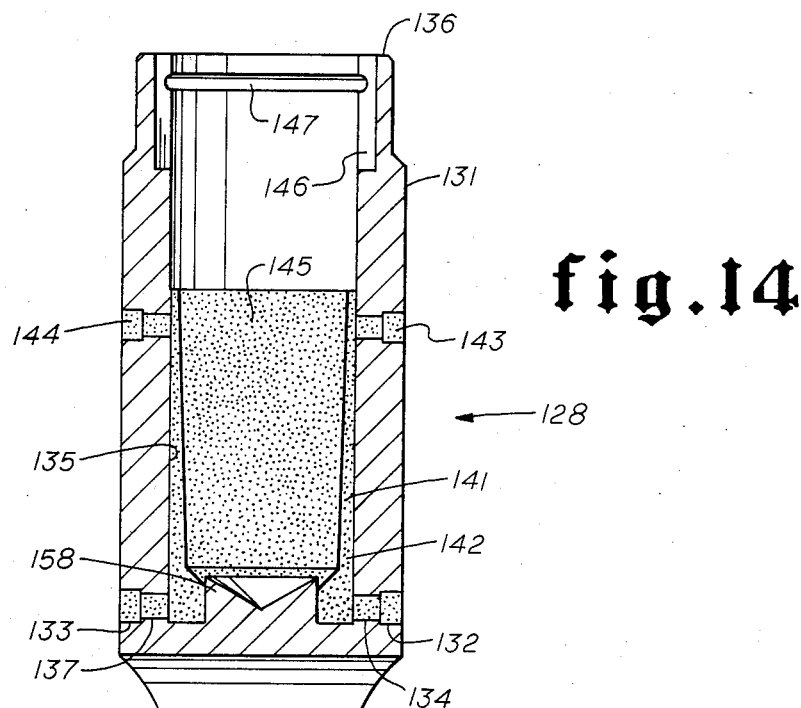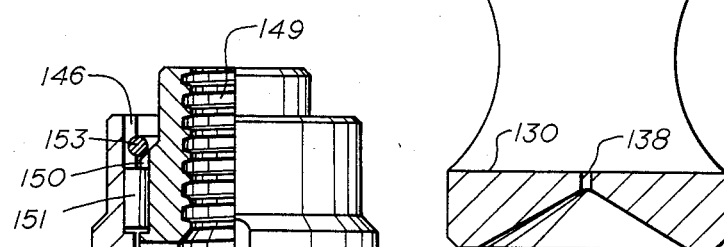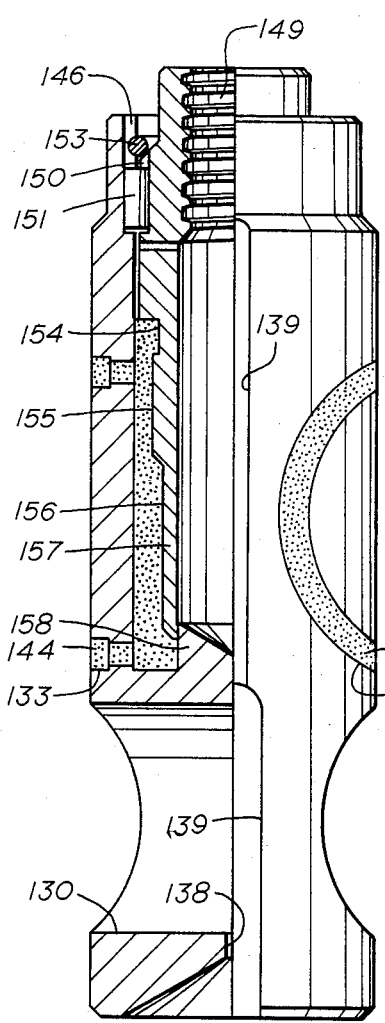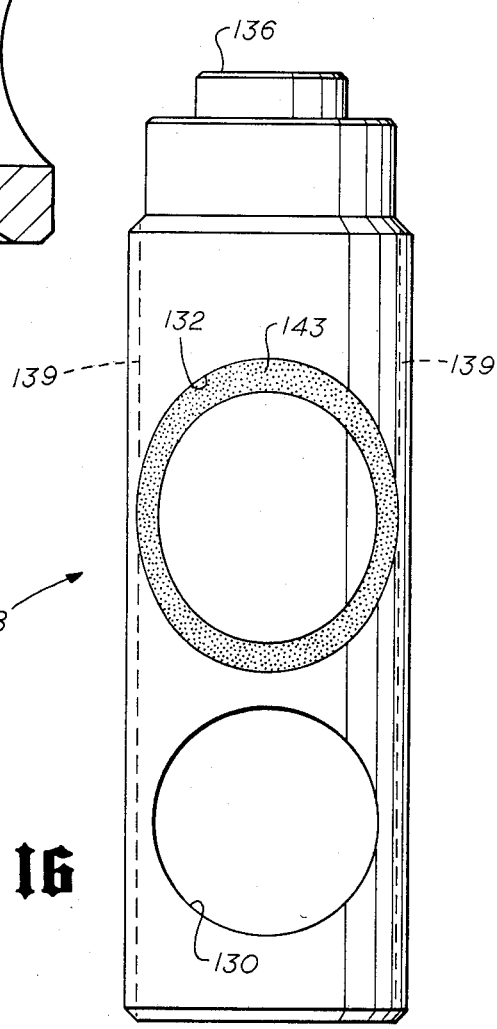
fig.14
fig.15
fig.16

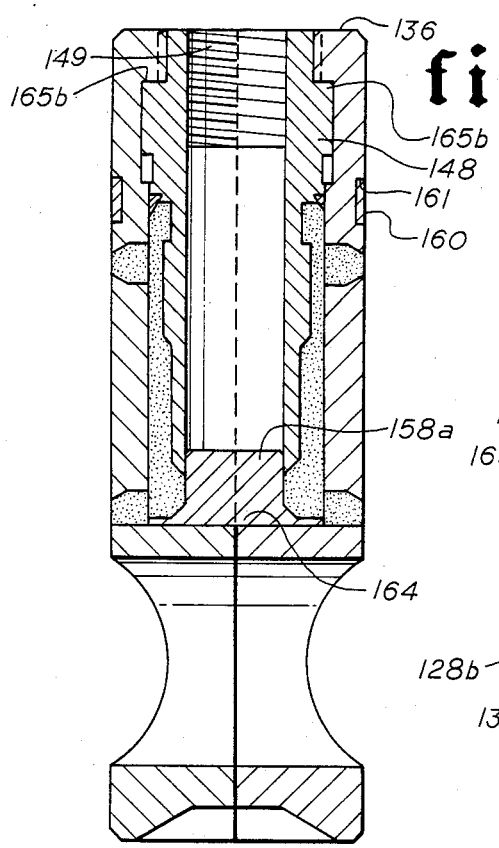
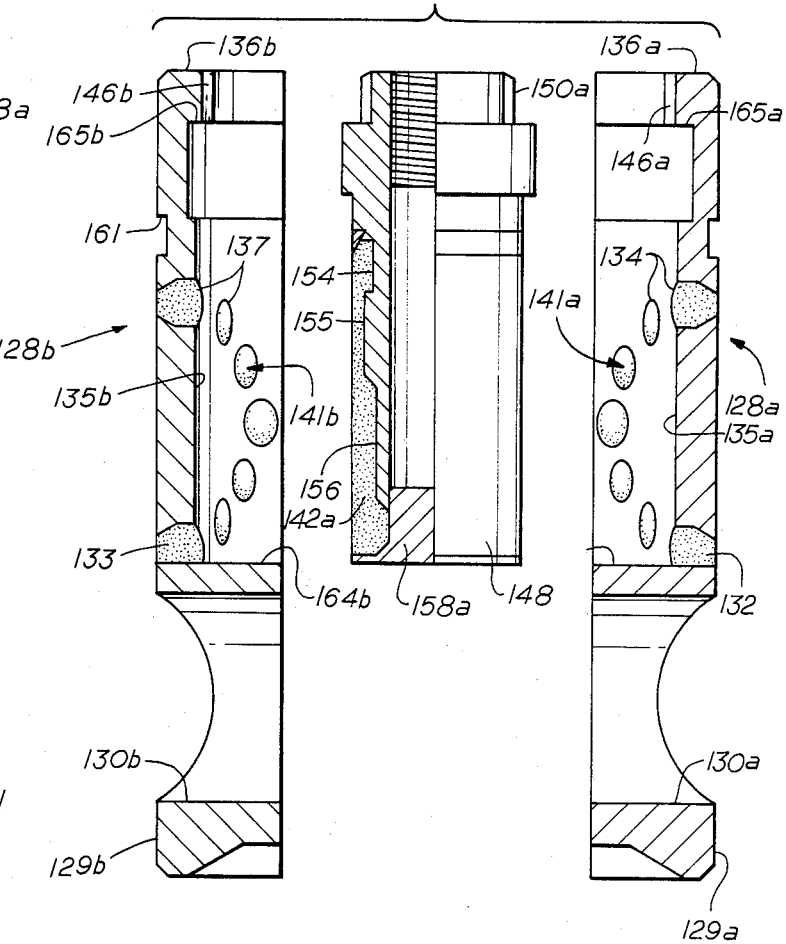
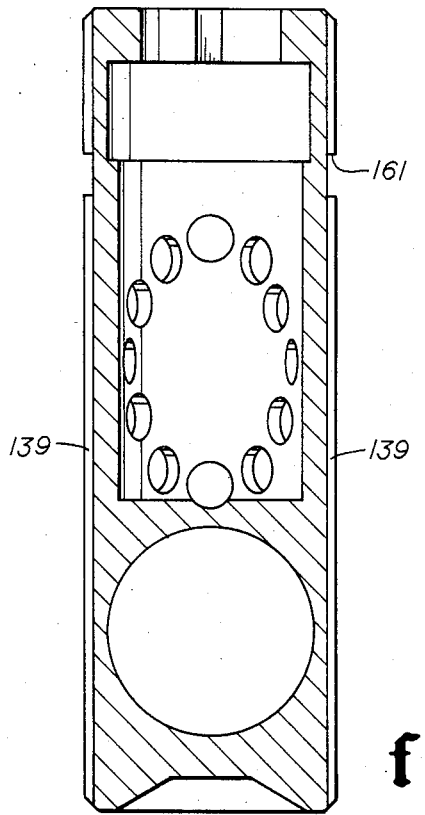
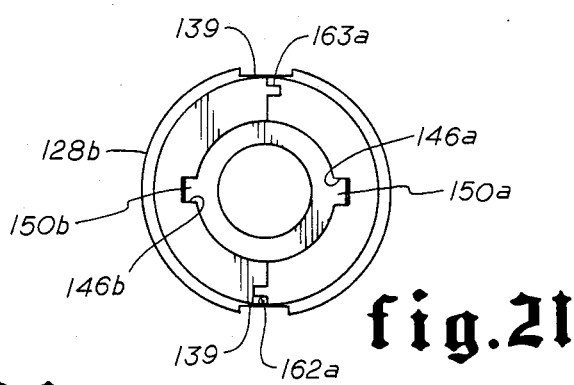
fig.18
fig.19
fig.20
fig.21

HIGH PRESSURE SHUT-OFF VALVE

CROSS REFERENCE TO RELATED APPLICATIONS

This application is a continuation-in-part of copending application Ser. No. 327,331, filed Dec. 4, 1981, now U.S. Pat. No. 4,433,827.

BACKGROUND OF THE INVENTION

1. Field of the Invention

This invention relates to new and useful improvements in high pressure shut-off valves and more particularly to an improved shut off-valve of in-line construction.

2. Brief Description of the Prior Art

Shut-off valves for controlling high pressure fluids and gases are well known in the art. Most shut-off valves, however, have been of an angle type construction or, if of an in-line construction, have not been capable of sealing adequately for very high pressure operation.

McCarthy U.S. Pat. No. 1,001,970 discloses a high pressure shut-off valve having an angle body construction with a sleeve type valve plug. The valve sleeve has upper and lower sealling gaskets which are compressed in valve closing movement but which do not seal completely around the valve plug assembly.

Collins U.S. Pat. No. 2,130,614 discloses an in-line valve having a vertically moving valve plug which operates through a horizontally disposed valve port. The valve member is inadequately packed for high pressure operation.

Penick U.S. Pat. No. 2,385,463 discloses an in-line valve with a vertically movable plug having a pair of separately movable valve discs movable by compression of a supporting rubber sleeve into sealing engagement with the wall of the valve cavity.

McWhorter U.S. Pat. No. 2,552,991 discloses an in-line valve, similar to Penick's, with a vertically movable plug having a pair of separately movable valve discs movable by compression of a supporting rubber sleeve into sealing engagement with the wall of the valve cavity. Wilson U.S. Pat. No. 3,013,825 discloses a wire line stripper having a rubber stripping element operated by line pressure to strip the liquid from the line.

Miller U.S. Pat. No. 3,084,898 discloses a valve assembly in which line pressure is used in valve closing operation.

Wing U.S. Pat. No. 3,115,329 shows a pressure operated valve having a piston with a peripheral rubber seal.

Bolling U.S. Pat. No. 3,353,783 discloses an in-line valve having a vertically movable plug valve assembly. The plug valve assembly is inadequately sealed for high pressure operation. This valve does show a movable valve seat which is compressed by line pressure against the valve member.

Gruber U.S. Pat. No. 3,377,048 discloses a tap valve of the type used for controlling water in sinks or tubs. This valve includes an arrangement to apply line pressure against the valve member in the closing position.

SUMMARY OF THE INVENTION

One of the objects of this invention is to provide a new and improved high pressure shut-off valve for use in the oil and gas industry, chemical processing plants and the like.

Another object of this invention is to provide a new and improved high pressure shut-off valve having an in-line construction providing for straight line flow of high pressure fluids or gases through the valve.

Another object of this invention is to provide a new and improved high pressure shut-off valve having a straight line construction with a reciprocal plug valve having a peripheral sealing element preventing pressure loss around the valve plug.

Still another object of this invention is to provide a new and improved in-line type high pressure shut-off valve which utilizes link pressure to compress the valve sealing element.

Still another object of this invention is to provide a new and improved high pressure shut-off valve having an improved compressible sealing element for a reciprocal valve plug which is protected from contamination under conditions of flow and protected against extrusion of the sealing element into the valve bore.

Still another object of the invention is to provide a high pressure shut-off valve of in-line construction which has a reciprocal plug which is sealed both upstream and downstream when in the open position.

Still another object of the invention is to provide a high pressure shut-off valve of in-line construction which has a reciprocal plug and which is self purging when in the open position.

Still another object the invention is to provide a new and improved high pressure shut-off valve having a construction which is field servicable.

Other objects of the invention will become apparent from time to time throughout the specification and claims as hereinafter related.

The above noted objects and other objects of the invention are accomplished by a high pressure shut-off valve which has a hollow valve body with an open end, closed end and a cylindrical cavity with a cover. Aligned inlet and outlet portions form a straight bore intersecting the valve cavity.

A plug valve assembly has a supporting mandrel reciprocally slidable to a position abutting the valve cavity closed end, with an end portion having a transverse valve passage and an intermediate portion for closing the valve body bore, the valve passage being aligned with the bore when retracted. An elastomeric sealing sleeve member on the mandrel seals the cavity wall around the bore when the valve is closed.

A non-rising threaded stem, operated by a hand wheel, moves the valve assembly and has a lost motion connection operable on overtravel to compress the the sleeve member longitudinally along the mandrel. Metal discs supported integrally on a supporting sleeve fill holes in the sleeve member to prevent extrusion of the sleeve into the bore. A pressure release passage bleeds line pressure to the cavity above the sleeve member when in the valve closed position.

In an alternate embodiment, the elastomeric sleeve member is molded in a circumferential recess in the mandrel and is constructed to have portions thereof extrude outward to compress a sealing ring portion against the wall of the cavity bore.

BRIEF DESCRIPTION OF THE DRAWINGS

FIG. 14 is a longitudinal central section of the mandrel assembly with the sealing rubber molded therein.

FIG. 15 is a longitudinal central section of the mandrel assembly with the central, movable portion in place inside the sealing rubber.

FIG. 16 is a view in side elevation of the valve mandrel assembly showing the valve opening and the sealing rubber ring in elevation.

FIG. 18 is a view in longitudinal central section of the valve mandrel assembly of FIG. 17.

FIG. 19 is an exploded view of the parts of the valve mandrel assembly of FIG. 18.

FIG. 20 is a detail view, partially in section, of one of the valve mandrel halves.

FIG. 21 is a top end view of the valve mandrel assembly of FIG. 18.

DESCRIPTION OF A PREFERRED EMBODIMENT

Figure 1:
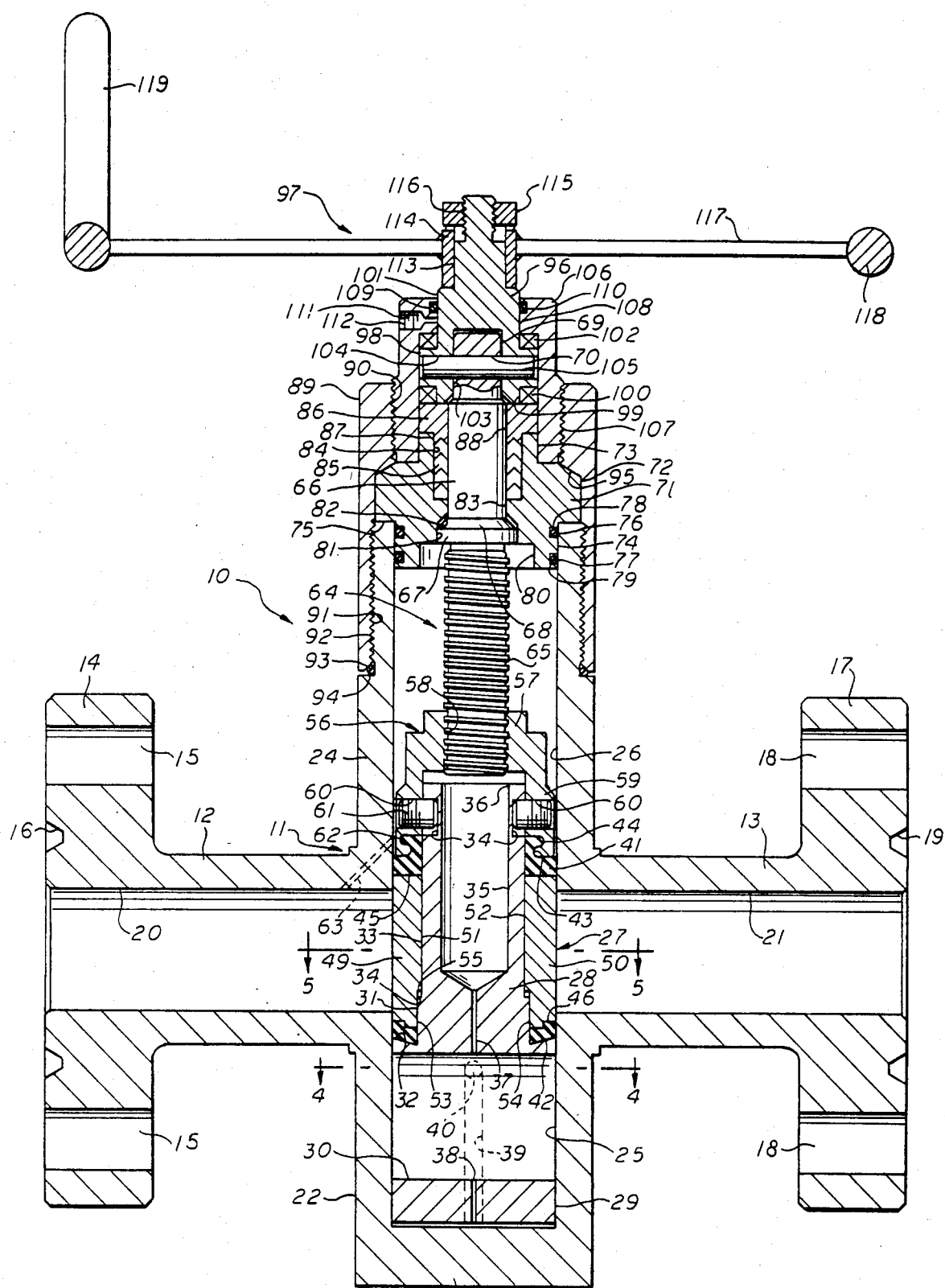
FIG. 1 is a view in longitudinal central section of one preferred embodiment of the high pressure shut-off valve of this invention in a valve closed position.
Figure 2:
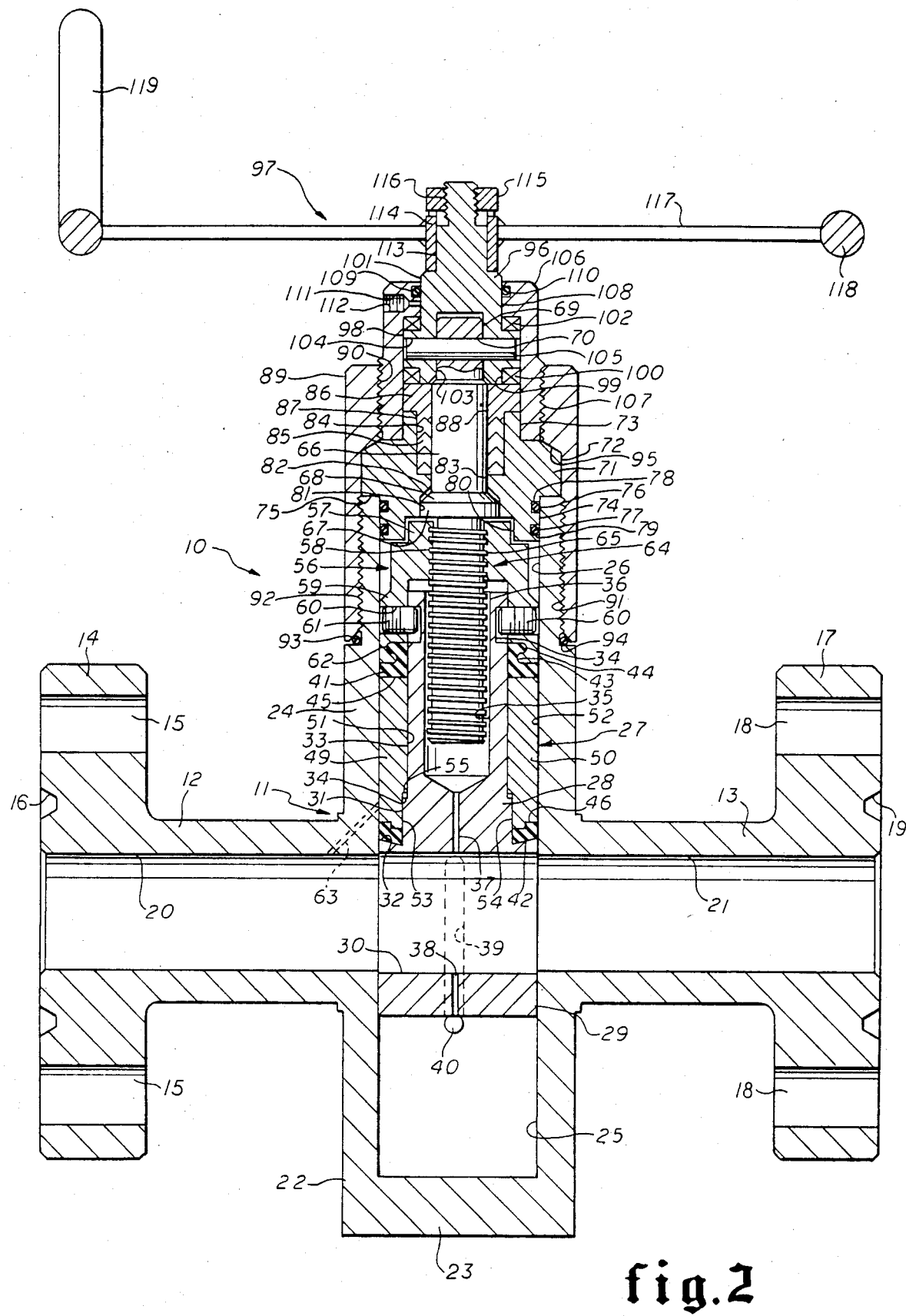
FIG. 2 is a sectional view showing the valve illustrated in FIG. 1 in a valve open position.
Figure 3:
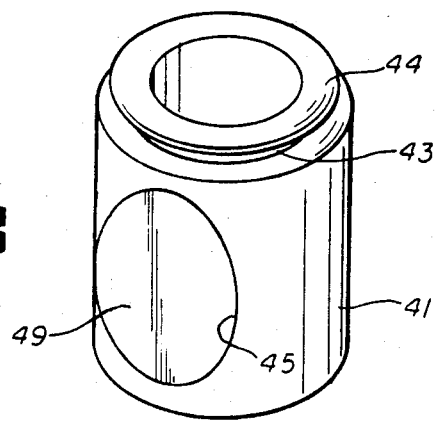
FIG. 3 is an isometric view of the valve sealing element.
Figure 4:
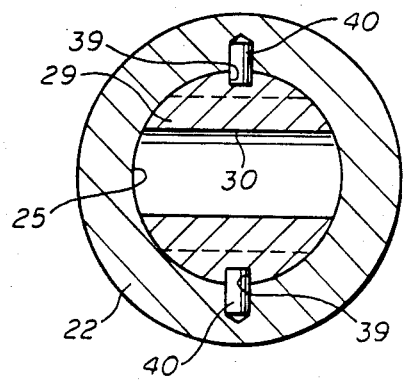
FIG. 4 is a sectional view taken on the line 4—4 of FIG. 1 showing the mandrel slots and guide pins in the valve body.
Figure 5:
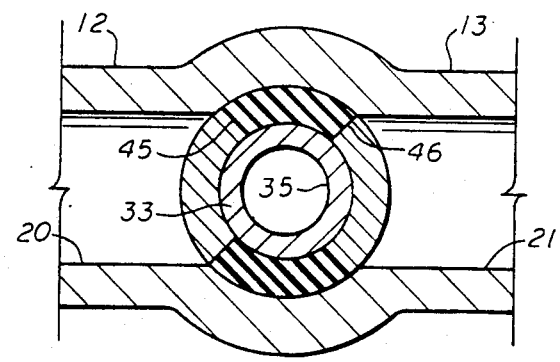
FIG. 5 is a sectional view taken on the line 5—5 of FIG. 1 showing the valve closing portion of the plug valve assembly.

Referring to the drawings by numerals of reference, and more particularly to FIGS. 1 and 2, there is shown a high pressure valve 10 for stopping the flow of high pressure fluids and gases. Valve 10 is designed for very high pressure operation and is preferably made of a forged alloy steel which permits use of the valve to meet the needs and requirements for hostile and corrosive environments. This is the embodiment shown in copending application Serial No. 327,331, filed Dec. 4, 1981.

Valve 10 comprises the valve body 11 which is preferably of a forged alloy steel. Valve body 11 has a tubular inlet portion 12 and tubular outlet portion 13 on opposite sides thereof. Tubular inlet portion 12 is provided with an end flange 14 having holes or apertures 15 for bolting to a flanged conduit or a flanged connection on a container, pressure vessel or the like. An annular groove 16 in the end face of flange 14 is provided to receive a sealing ring or gasket (not shown). Tubular outlet portion 13 has a flange 17 with holes or apertures 18 for bolting to another flange connector on a conduit or pressure vessel or the like. Annular groove 19 is provided to receive a sealing ring or gasket.

Inlet valve portion 12 has a tubular passage 20 therethrough which is aligned with tubular passage 21 in outlet valve portion 13. Passages 20 and 21 are in direct alignment with each other and comprises a continuous bore passing through the valve body in a straight line. Valve body 11 has a tubular body portion 22 extending downward at a right angle to the valve bore and having an end wall 23, and another tubular body portion 24 extending upward at a right angle to the valve bore to provide a support for the operating mechanism of the valve. Tubular valve body portion 22 has a cylindrical inner wall 25 which intersects the valve bore (passages 20 and 21) and opens into a cylindrical inner wall 26 of tubular valve body portion 24. The cylindrical wall portions 25 and 26 of valve body portions 22 and 24 form a smooth continuous cylindrical passage in which the valve assembly is moved.

A cylindrical valve plug assembly 27 is positioned for vertical sliding movement in the vertically extending passage in valve body 11 defined by cylindrical walls 25 and 26. Valve plug assembly 27 consists of a mandrel 28 having an enlarged cylindrical end portion 29 having a horizontally extending valve passage 30 therethrough. Mandrel 28 is supported for movement in the body valve body so that upward movement thereof will cause valve passage 30 to be aligned with the valve bore (passages 20 and 21) to permit flow of fluid through the valve. Mandrel 28 has a first portion 31 of reduced diameter which defines a shoulder 32 extending peripherally of the mandrel. A second portion 33 of reduced diameter extends upward from a second peripherally extending shoulder 34. Mandrel portion 33 is provided with a plurality of slots or grooves 34 which cooperate with retainer pins which will be subsequently described.

Mandrel portion 33 is tubular in shape and has an internal bore 35 extending longitudinally thereof which is open at its top end portion 36 and has a pressure equalizing port 37 opening from its bottom end into valve passage 30 in the enlarged mandrel portion 29. Mandrel portion 29 also has a pressure equalizing port or passage 38 opening through the wall thereof to permit pressure to exhaust the space below the end of the mandrel adjacent to end wall 23 of valve body portion 22. Mandrel portion 29 has a pair of longitudinally extending grooves 39 on opposite sides thereof into which are fitted pins 40 which guide mandrel 29 for vertical or longitudinal movement while keeping the mandrel positioned so that the valve passage or port 30 will be aligned with the valve bore (passages 20 and 21) when the valve plug assembly is moved to an elevated position as shown in FIG. 2.

A valve sealing assembly is supported on mandrel 27 and consists of a tubular rubber (or synthetic rubber or other suitable elastomeric material) sealing element 41. Sealing element 41 has its lower end portion beveled as at 42 to fit the shoulder 32 of mandrel 27. The upper end portion of sealing element 41 is provided with a peripheral groove 43 defining a flange 44. Sealing element 41 has openings 45 and 46 on opposite sides thereof which are aligned with and slightly larger than the valve opening defined by the intersection of the valve bore (passages 20 and 21) with the vertically extending passage in the valve body defined by cylindrical walls 25 and 26.

Figure 6:
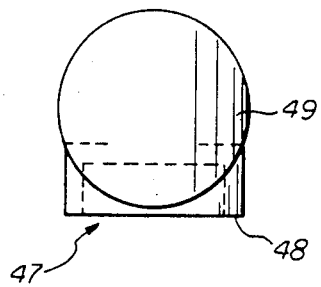
FIG. 6 is a view in side elevation of the metal sleeve and extrusion preventing discs fitting inside the sealing sleeve.
Figure 7:
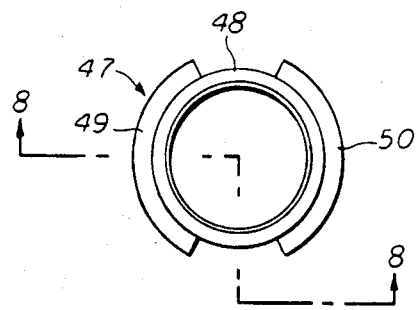
FIG. 7 is a bottom plan view of the disc and sleeve element shown in FIG. 6.
Figure 8:
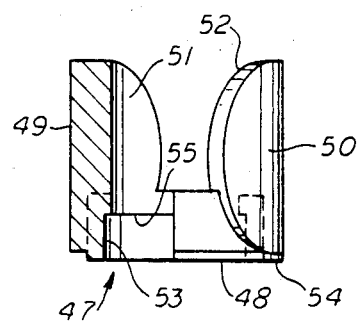
FIG. 8 is a sectional view of the disc and sleeve element taken on the line 8—8 of FIG. 7.

A metal sealing element retaining sleeve member 47 is positioned within rubber sealing element 41 and surrounds the upper portion 33 of mandrel 28. Sleeve member 47 has a tubular sleeve portion 48 (see FIGS. 6–8) with cylindrically curved discs 49 and 50 formed integrally therewith on opposite sides thereof. The outer surface of discs 49 and 50 lie on a single cylindrical surface fitting in the vertical passage in the valve body 11 defined by cylindrical walls 25 and 26 for smooth vertical movement therein. This cylindrical surface is continuous with the outer surface of cylindrical rubber sealing element 41. Discs 49 and 50 fit within passages or openings 45 and 46 in rubber sealing element 41 and are larger than the opening from passages 20 and 21 into the vertically extending passage or opening in which the valve plug assembly 27 is moved.

Thus, when the valve is in a closed position, as seen in FIG. 1, the valve discs 49 and 50 prevent extrusion of the rubber sealing element into the valve bore under pressure. The inner surfaces 51 and 52 of discs 49 and 50 lie on a single cylindrical surface and fit closely around the reduced tubular portion 33 of mandrel 28 for sliding movement thereon. Cylindrical surfaces 51 and 52 open into lower enlarged cylindrical surfaces 53 and 54 which fit on surface 31 of mandrel 28 for sliding movement thereon. Shoulder 55 between surfaces 51 and 53 (and 52 and 54) is spaced from and engageable with shoulder 34 on mandrel 28.

At the upper end of valve plug assembly 27, there is provided a seal compression nut 56 which is cup shaped and fits over the upper end of mandrel 28 and rubber sealing element 41. Seal compression nut 56 has a thick end wall portion 57 which is internally threaded as at 58 to receive a valve stem. Seal compression nut 56 has tubular side wall 59 with a plurality of apertures or openings 60 which are threaded and have pins 61 secured therein which fit into grooves or slots 34 in mandrel 28. Pins 61 are smaller in diameter than the width of slots 34 and engage the upper edge thereof on vertical movement and permit relative movement in a downward direction permitting the application of compressive force to the upper end of rubber sealing element 41.

The lower end of tubular wall portion 59 of seal compression nut 56 is provided with internal groove 62 which fits the upper flange portion 44 of rubber sealing element 41. The outer surface of the tubular portion 59 of seal compression nut 56 is slightly smaller than the passage defined by the cylindrical wall 26 of the upper tubular valve body portion 24. This provides a clearance which permits fluid pressure from passage or opening 20 (high pressure side of the valve) to enter the chamber above the valve plug assembly 27 through a pressure release passage 63 in the valve body 11. The upper portion of rubber sealing element 41 has a larger annular surface area than the lower portion as a result of the reduced diameter of the upper portion 33 of mandrel 28.

Valve stem 64 has a threaded portion 65 which extends into threaded opening 58 in seal compression nut 57. Rotation of valve stem 64 causes seal compression nut to move upwardly or downwardly along the valve stem to raise or lower plug valve assembly 27. Valve stem 64 has a smooth cylindrical portion 66 at its upper end with a flange 67 having a tapered edge portion 68 adjacent the upper end of the threaded portion 65. The extreme upper end 69 of valve stem 64 is reduced in diameter and has an opening 70 for receiving a connector pin.

A valve stem bonnet gland or adapter 71 is provided at the upper end of valve body portion 24 to support the valve stem 64 for rotary movement. Valve stem bonnet gland 71 has a central portion 72 with a hollow extension 73 extending from one end and another hollow extension 74 extending from the opposite end. Shoulder 75 between the enlarged central portion 72 and tubular portion 74 abuts the upper end of valve body portion 24. Tubular extension 74 fits tightly in the upper end of valve body portion 24 and is sealed against pressure leakage by O-rings 76 and 77 positioned in peripheral grooves 78 and 79. Valve stem bonnet gland 71 has a counterbore 80 which opens into a further counterbore 81 having a tapered portion 82 providing a valve stem back seat engageable by the tapered surface 68 on valve stem flange 67. Tapered portion 82 of counterbore 81 opens into a smaller bore 83 which provides a bearing surface in which the upper cylindrical portion 66 of valve stem 64 is supported.

The upper portion of valve stem bonnet gland 71 has a counterbore 84 which provides an annular cavity surrounding the upper valve stem portion 66. This cavity is provided with valve stem packing 85 which is preferably a chevron type packing. A packing adaptor 86 fits over the end of extension 83 on valve stem bonnet gland 71 and has a tubular extension 87 which extends into engagement with the upper portion of valve stem packing 85 to hold the same under compression. Packing adapter 86 has a bore 88 of the same size as the cylindrical portion 66 of valve stem 64 to support the same as a journal bearing therefor.

A cap or valve bonnet adapter nut 89 is supported on the upper end of valve body portion 24. Cap 89 is tubular in shape and is internally threaded as indicated at 90. Cap 89 has an enlarged bore which is internally threaded as indicated at 91 and is supported in threaded relation with the threaded end portion 92 of the upper valve body portion 24. An O-ring or gasket 93 is provided as a pressure seal between the lowermost end of cap 89 and shoulder 94 on valve body portion 24. Cap 89 has an internally beveled portion 95 which fits against the upper end of valve bonnet adapter 71 to secure the same in tight engagement with the end of valve body portion 24.

A valve stem adapter 96 is positioned at the end of valve stem 64 to provide for connection to a hand wheel 97 for rotation of the valve stem for moving the valve plug assembly 27 upwardly and downwardly in the valve body. Valve stem adapter 96 has a central cylindrical body portion 98 with a lower cylindrical portion 99 of reduced diameter providing a shoulder on which there is positioned bearing assembly 100. Valve stem adapter 96 has an upper cylindrical portion 101 of reduced diameter provding a shoulder on which there is supported another bearing assembly 102. Adapter 96 has an internal bore or cavity 103 into which the upper extension 69 of valve stem 64 extends. The main portion 98 of valve stem adapter 96 has a laterally extending opening 104 which is aligned with opening 70 and in which there is positioned a valve stem retaining pin 105.

Valve stem adapter 96 and bearing assemblies 100 and 102 are secured by bearing retainer 106. The bearing retainer 106 is cup shaped and externally threaded as at 107 for threaded connection in the internally threaded opening 90 of cap 89. Bearing retainer 106 has an internal bore 108 which functions as a journal bearing supporting the upper portion 96 of the valve stem adapter. Bore 108 is provided with an annular groove 109 and O-ring 110 to seal the valve stem adapter against pressure leakage. Bearing retainer 106 has a threaded grease fitting 111 with a plug 112 therein to permit application of grease to the bearings during operation.

The upper end of valve stem adapter 96 has a portion 113 of reduced diameter which receives cylindrical hub 114 of hand wheel 97. Hub 114 is secured in place by a retaining nut 115 on the threaded extension 116 of valve stem adapter 96. Hand wheel 97 has a plurality of spokes 117 leading to the annular wheel portion 118 from which there extends an operating handle 119.

OPERATION

The valve described above is a forged steel valve of straight through flow design that can be used for stopping the flow of high pressure fluids and gases. Forged alloy steel is preferred in the construction to permit the application of the valve in hostile and corrosive environments.

The valve 10 is shown in FIG. 1 in a closed position. The plug valve assembly 27 is completely lowered until the bottom end portion 29 of mandrel 28 engages the end wall 23 of valve body portion 22.

The valve is normally connected with inlet portion 12 connected to high pressure and outlet portion 13 connected to an outlet line or connection. The valve body is provided with seals against leakage of high pressure fluid at a number of points. O-ring or packing 93, O-rings 76, 77 and 110, and valve stem packing 85 provide for a complete seal against pressure loss through any of the points of assembly of the valve.

In the position shown in FIG. 1, the bottom end portion 29 of mandrel 28 has just contacted the end wall 23 of valve body portion 22. The valve plug assembly 27, including mandrel 28, sealling element 41 and retaining sleeve member 47 are moved reciprocally by means of seal compression nut 56 which rides up and down along valve stem 64 on rotation thereof by hand wheel 97. In the position shown, hand wheel 97 has been moving compression nut 56 downward.

In this position, further rotation of hand wheel 97 is possible which will move seal compression nut 56 downward relative to the upper tubular portion 33 of mandrel 28. This relative movement will cause rubber sealing element 41 to be compressed around the entire peripheral surface of mandrel 28 to provide a very tight seal against the cylindrical walls 25 and 26 of the valve body 11. This continued downward movement of seal compression nut 56 can be continued until pins 61 engage the bottom edge of the respective grooves or slots 34 in the tubular portion 33 of mandrel 28.

In the position shown, high pressure fluid from the inlet bore 20 is passed through pressure release passage 63 into the cavity of valve body portion 24 above the mandrel 28 and rubber sealing element 41. As noted in the description of parts and mode of assembly of the valve, rubber sealing element 41 has a large annular area on the upper side than on the lower side thereof. As a result of this differential in area, the pressure from the inlet bore 20 will maintain rubber sealing element 41 under compression.

Thus, the hand wheel 97 can be tightened to compress the rubber sealing element 41 and the fluid pressure from inlet bore 20 will maintain sealing element 41 under compression when the hand wheel is backed off to the point where pins 61 just engage the upper edge of slots 34, as shown in FIG. 1. In this position, the valve is being held in a tightly sealed position by application of the inlet pressure to the cavity above the rubber sealing element 41, even though hand wheel 97 has been backed off to the point where further movement will cause seal compression nut 56 to rise along the threaded portion 65 of valve stem 64 to start to move the valve plug assembly toward open position.

In the position shown in FIG. 1, with rubber sealing element 41 held in tight compression, first by downward movement of seal compression nut 56 and subsequently by application of fluid inlet pressure above the sealing element, the discs 49 and 50 are sealing the valve bore to prevent flow of fluid or gas therethrough and also function to prevent extrusion of rubber sealing element 41 into the valve bore. It should be noted that the valve plug assembly 27 is constructed with the rubber sealing element 41 extending completely around the mandrel 28 so that a seal is provided against the bore of the valve body 11 around the entire contacting surface except for the portion occupied the anti-extrusion discs 49 and 50. The amount of downward movement of discs 49 and 50 and the sleeve portion 48 is limited by the engagement of shoulder 55 with shoulder 34 on mandrel 28. The rubber sealing element 41 therefore provides a positive seal around the entire perimeter of the reciprocal plug assembly and seals in both the upstream and downstream directions.

Rotation of the valve wheel 97 by handle 119 or rim 118 will rotate the valve stem 64 for moving the plug valve assembly 27. Rotation in a clockwise direction moves the plug valve assembly downward toward the closed position shown in FIG. 1 while rotation in a counterclockwise direction moves the plug valve assembly 27 toward the open position shown in FIG. 2. The valve stem 64, and particularly the threaded portion 65 thereof, is a non-rising stem. It is rotated in a fixed position longitudinally as confined by the stem bonnet gland 71, stem adapter 96, bearings 100 and 102, etc.

As hand wheel 97 is rotated in a counterclockwise direction, the threaded portion 65 of valve stem 64 causes seal compression nut 56 to move upward. the bore 35 of mandrel 28 provides for movement of the plug valve assembly 27 to a fully opened position, as shown in FIG. 2. As plug valve assembly 27 is moved upward by rotation of valve stem 64, the rubber sealing element 41 is first decompressed and then the engagement of pins 61 with the upper edge slots 34 causes the entire assembly to move together toward an open position. Guide pins 40 in slots 39 keep the mandrel 28 (and plug valve assembly 27) from turning during movement and thus assure alignment of valve mandrel bore 30 with the valve body bore when moved to a valve open position.

As plug valve assembly 27 is moved upward, pressure from above the valve assembly can vent through pressure release passage 37, first into the valve mandrel bore 30 and then into the main valve bore when the valve begins to align with said bore. Continued movement of plug valve assembly 27, by counterclockwise rotation by hand wheel 97, brings it to the position shown in FIG. 2 with mandrel bore 30 in alignment with inlet passage 20 and outlet passage 21 which form the continuous straight, in line bore of the valve body. When the plug valve assembly is moved to a fully opened position, the entire sealing element 41 is positioned above the main flow of fluid or gases through the bore of the valve body. The valve assembly is self purging in the open position as a result of the aspirating effect produced by flow of fluids or gases through valve opening 30 along the aperture or opening 38 extending into the bottom of cavity 26.

This valve does not require any lubrication in normal operation. The bearing assemblies 100 and 102 are prepacked at the plant and are sealed to the bearing elements. However, grease fitting 111 is provided in the bearing retainer nut 106 if greasing should ever be required. The entire valve is field repairable. The plug valve assembly 27 may be removed for repair or replacement by removing bonnet adapter nut or cap 89 after first releasing or stopping the application of line pressure.

The stem packing 85 and bearing assemblies 100 and 102 may be changed even while the valve is under pressure. Such a change is accomplished by means of the back seat 82. To change the packing and bearings, the valve is moved first to a closed position as shown in FIG. 1. Next, the bearing retainer 106 is backed off slowly in a clockwise direction and the hand wheel 97 is turned slowly in the clockwise direction. This allows the valve stem 64 to move up and back seat shoulder 68 against the back seat 82 in the bonnet adapter 71. If the valve back seats and seals and pressure releases from the stem packing 84, the bearing retainer 106 may then be completely removed. Next, the stem adapter 96 is removed and the stem adapter pin 105 and the bearing assemblies 100 and 102 are removed. The stem packing 84 is then removed. To install new packing and bearings, the procedure just described is carried out in reverse order.

DESCRIPTION OF ANOTHER PREFERRED EMBODIMENT

Figure 9:
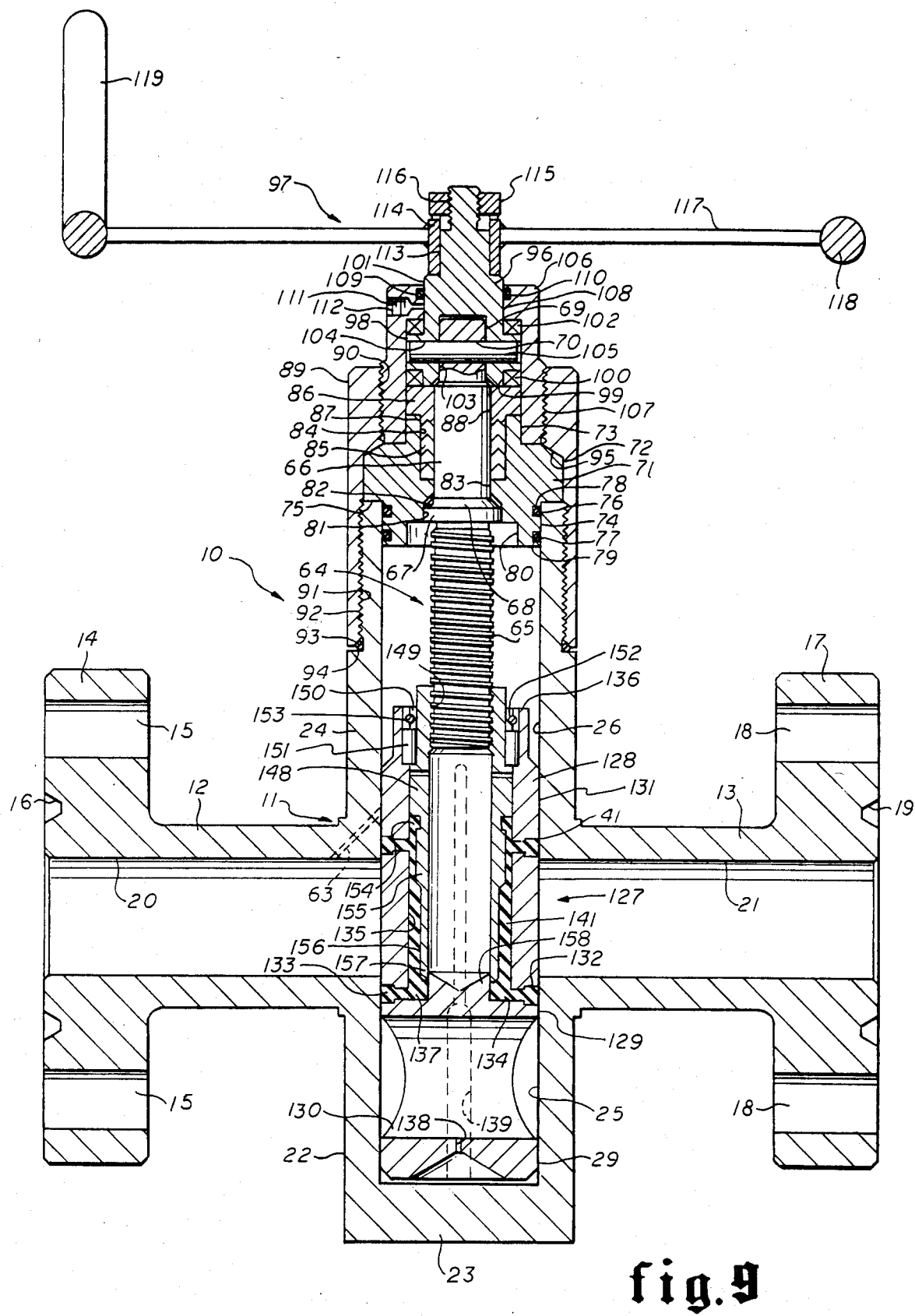
FIG. 9 is a view in longitudinal central section of another preferred embodiment of the high pressure shut-off valve of this invention in a valve closed position.
Figures 10, 11, 12, 13:
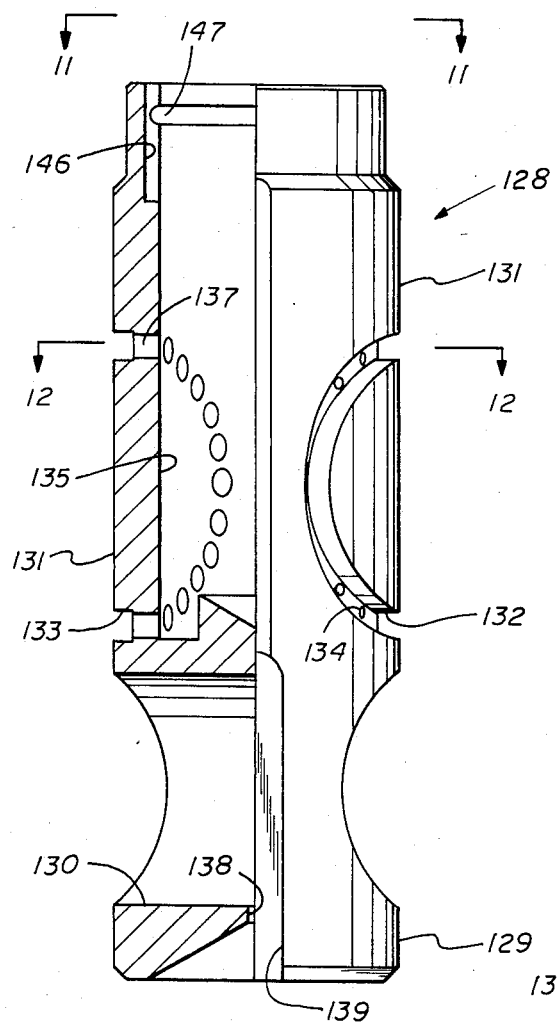
FIG. 10 is a partially sectioned view of the valve mandrel assembly from the valve shown in FIG. 9.
FIG. 11 is an end view, from the line 11—11, of the mandrel assembly in FIG. 10.
FIG. 12 is a sectional view taken on the line 12—12 of FIG. 10.
FIG. 13 is a detail view, in elevation, of the slot and apertures in the mandrel assembly in which the sealing material is positioned.

Referring to the drawings by numerals of reference, and more particularly to FIGS. 9–16, there is shown a high pressure valve 10 for stopping the flow of high pressure fluids and gases. Valve 10 is designed for very high pressure operation and is preferably made of a forged alloy steel which permits use of the valve to meet the needs and requirements for hostile and corrosive environments. This has the same basic structure as the embodiment shown in FIG. 1, except for the modificartion of the plug valve assembly. In FIG. 9, the components, except for the plug valv assembly 127, are the same as and have the same function and the same reference numerals as the corresponding parts in FIG. 1. The detailed description will therefore begin with the plug valve assembly 127.

A cylindrical valve plug assembly 127 is positioned for vertical sliding movement in the vertically extending passage in valve body 11 defined by cylindrical walls 25 and 26. Valve plug assembly 127 consists of a hollow outer piston 128 having a solid cylindrical end portion 129 with a transversely extending valve passage 130 therethrough. Outer piston 128 is supported for movement in the body valve body so that upward movement thereof will cause valve passage 130 to be aligned with valve bore passages 20 and 21 to permit flow of fluid through the valve. Outer piston 128 has a smooth cylindrical surface 131 of constant diameter which has a sliding fit in the cavity defined by cylindrical walls 25 and 26 of the valve casing.

Outer piston portion 133 is tubular in shape and has an internal bore 135 extending longitudinally thereof which is open at its top end portion 136. Outer piston end portion 129 also has a pressure equalizing port or passage 38 opening through the wall thereof to permit pressure to exhaust the space below the end of the outer piston adjacent to end wall 23 of valve body portion 22. Outer piston end portion 129 has a pair of longitudinally extending grooves 139 on opposite sides thereof into which are fitted pins, as in FIG. 1, which guide outer piston 128 for vertical or longitudinal movement while keeping it positioned so that the valve passage or port 130 will be aligned with the valve bore (passages 20 and 21) when the valve plug assembly is moved to an elevated position (as shown in FIG. 2).

A valve sealing assembly is supported on outer piston 128 and consists of a rubber (or synthetic rubber or other suitable elastomeric material) sealing element 141 secured therein. Piston 128 has circular grooves 132 and 133 in the surface 131 in diametrically opposed relation. A plurality of holes 134 and 137 extend from grooves 132 and 133 into piston bore 135. Sealing element 141 is molded in place in piston 128, with a tapered portion 142 in the bore 135, and portions 143 and 144 filling grooves 132 and 133 and holes 134 and 137. The central portion 145 of the rubber material is drilled or cut out, after molding, to produce the desired taper.

The upper end portion 136 of piston 128 is configured to receive an inner operating piston, to be described below. The upper end 136 has a pair of longitudinally extending slots and an annular retaining groove 147 for securing the inner piston in place.

Inner piston 148 is seen in section in FIGS. 9 and 14. Inner piston 148 is tubular and is internally threaded at 149 to receive the threaded portion 65 of valve stem 64. Groove 150 on the exterior of piston 148 are aligned with grooves 146 on piston 128 and receive pins 151 which restrain the pistons from rotating in relation to each other while permitting longitudinal movement. A groove 152 on the outside of piston 148 is aligned with groove 147 and receives a retaining ring 153. The outer surface of piston 148 includes a groove 154 and stepped surfaces 155 and 156. The lower end portion 157 of piston 148 is slidably guided on cylindrical boss 158 in piston 128.

When inner piston 148 is inserted inside piston 128 and pressed into the assembled position and secured by ring 153 and pins 151, the tapered rubber portion 142 of sealing element 141 is forced into the configuration seen in the cross section shown in FIGS. 9 and 14. When assembled in this manner, the inner piston 148 is capable of overtravel relative to piston 128 and can further compress the rubber sealing material to transmit uniform outward pressure to sealing ring portion 143 and 144 to seal around the valve passages 20 and 21 in the valve closed position. In this embodiment, the portion of piston surface 131 inside grooves 143 and 144 has the same shape and performs the same function as the discs 49 and 50 in the embodiment of FIG. 1.

OPERATION

The valve described above is a forged steel valve of straight through flow design that can be used for stopping the flow of high pressure fluids and gases. Forged alloy steel is preferred in the construction to permit the application of the valve in hostile and corrosive environments. The operation is substantially the same as described in FIG. 1, except for the difference in construction of the sealing element.

The valve 10 is shown in FIG. 9 in a closed position. The plug valve assembly 127 is completely lowered until the bottom end portion 129 of outer piston 128 engages the end wall 23 of valve body portion 22.

The valve is normally connected with inlet portion 12 connected to high pressure and outlet portion 13 connected to an outlet line or connection. The valve body is provided with seals against leakage of high pressure fluid at a number of points. O-ring or packing 93, O-rings 76, 77 and 110, and valve stem packing 85 provide for a complete seal against pressure loss through any of the points of assembly of the valve.

In the position shown in FIG. 9, the bottom end portion 129 of outer piston 128 has just contacted the end wall 23 of valve body portion 22. The valve plug assembly 127, including outer piston 128, sealing element 141 and inner piston 148 are moved reciprocally by means of the threaded opening 149 which rides up and down along valve stem 64 on rotation thereof by hand wheel 97. In the position shown, hand wheel 97 has been moving inner piston 148 downward.

In this position, further rotation of hand wheel 97 is possible which will move inner piston 148 downward relative to outer piston 128. This relative movement will cause rubber sealing element 141 to be compressed between the outer surface of piston 148 and the inner surface of piston 128 to press the rubber material uniformly through holes 134 and 137 to apply uniform pressure on sealing ring portions 132 and 133 to press the same to provide a very tight seal against the cylindrical walls 25 and 26 of the valve body 11.

In this position, the valve is being held in a tightly sealed position by application of the inlet presure to the cavity above the rubber sealing element 141, even though hand wheel 97 has been backed off to the point where further movement will cause seal inner piston 148 to begin to rise along the threaded portion 65 of valve stem 64 to start to move the valve plug assembly toward open position.

In the position shown in FIG. 9, with rubber sealing element 141 held in tight compression, the piston surfaces within grooves 132 and 133 close the valve bore to prevent flow of fluid or gas therethrough and also function to prevent extrusion of rubber sealing element ring portions 143 and 144 into the valve bore.

Rotation of the valve wheel 97 by handle 119 or rim 118 will rotate the valve stem 64 for moving the plug valve assembly 127. Rotation in a clockwise direction moves the plug valve assembly downward toward the closed position shown in FIG. 9 while rotation in a counterclockwise direction moves the plug valve assembly 127 toward the open position shown in FIG 2. The valve stem 64, and particularly the threaded portion 65 thereof, is a non-rising stem. It is rotated in a fixed position longitudinally as confined by the stem bonnet gland 71, stem adapter 96, bearings 100 and 102, etc.

As hand wheel 97 is rotated in a counterclockwise direction, the threaded portion 65 of valve stem 64 causes piston 148 to move upward. The bore 135 of outer piston 128 provides for movement of the plug valve assembly 127 to a fully opened position, as shown in FIG. 2. As plug valve assembly 127 is moved upward by rotation of valve stem 64, the rubber sealing element 141 is first decompressed and then the engagement of pins 151 with the upper shoulder on piston 148 and retaining ring 153 causes the pistons 128 and 148 to move together toward an open position. Guide pins 151 keep the outer piston 128 from turning relative to inner piston 148 during movement, while the pins cooperating with grooves 139 prevent the plug valve assembly from turning and thus assure alignment of valve piston bore 130 with the valve body bore when moved to a valve open position.

As plug valve assembly 127 is moved upward, plug valve assembly 27 is brought to the position shown in FIG. 2 with outer piston bore 130 in alignment with inlet passage 20 and outlet passage 21 which form the continuous straight, in line bore for the valve body. When the plug valve assembly is moved to a fully opened position, the entire sealing element 141 is positioned above the main flow of fluid or gases through the bore of the valve body. The valve assembly is self purging in the open position as a result of the aspirating effect produced by flow of fluids or gases through valve opening 130 along the aperture or opening 138 extending into the bottom of cavity 26.

DESCRIPTION OF STILL ANOTHER PREFERRED EMBODIMENT

Referring to the drawings by numerals of reference, and more particularly to FIGS. 17–21, there is shown a high pressure valve 10 for stopping the flow of high pressure fluids and gases. Valve 10 is designed for very high pressure operation and is preferably made of a forged alloy steel which permits use of the valve to meet the needs and requirements for hostile and corrosive environments. This has the same basic structure as the embodiment shown in FIG. 9, except for modifications in the bonnet assembly and in the plug valve assembly. In FIG. 9, the components, except for the plug valve assembly 127, are the same as and have the same function and the same reference numerals as the corresponding parts in FIG. 1. The bonnet assembly differs only in that some of the sealing O-rings are omitted and the handwheel 97 is secured by lug bolt 116a extending through washer 115a into the end portion 113 of the bonnet. The detailed description will therefore begin with the plug valve assembly 127.

A cylindrical valve plug assembly 127 is positioned for vertical sliding movement in the vertically extending passage in valve body 11 defined by cylindrical walls 25 and 26. Valve plug assembly 127 consists of a hollow outer piston 128 which is split longitudinally into two substantially identical halves 128a and 128b which are secured together by a band 160 in a peripheral shallow flat groove 161 (FIG. 18). The assembled piston halves 128a an 128b have a cylindrical end portion 129 with a transversely extending valve passage 130 therethrough. Outer piston 128 is supported for movement in the body valve body so that upward movememt thereof will cause valve passage 130 to be aligned with valve bore passages 20 and 21 to permit flow of fluid through the valve. Outer piston 128, as assembled, has a smooth cylindrical surface 131 of constant diameter which has a sliding fit in the cavity defined by cylindrical walls 25 and 26 of the valve casing.

Outer piston 128 is tubular in shape and has an internal bore 135 (formed of half cylinders 135a and 135b) extending longitudinally thereof which is open at its top end portion 136. Outer piston end portion 129 has a pair of longitudinally extending grooves 139 on opposite sides thereof, along the parting line of piston halves 128a and 128b, into which are fitted pins, as in FIG. 1, which guide outer piston 128 for vertical or longitudinal movement while keeping it positioned so that the valve passage or port 130 will be aligned with the valve bore passages 20 and 21 when the valve plug assembly is moved to an elevated position (as shown in FIG. 2).

A valve sealing assembly is supported on outer piston 128 and consists of a rubber (or synthetic rubber or other suitable elastomeric material) sealing element 141 secured therein. Piston half 128a has circular grooves 132 in the surface 131a. Piston half 128b has circular grooves 132 in the surface 131b. When assembled, piston 128 has the circular grooves 132 and 133 in diametrically opposed relation. A plurality of holes 134 extend from groove 132 into piston bore 135. A plurality of holes 137 extend from groove 133 into piston bore 135. A portion of sealing element 141a is molded in place in piston half 128a, with portion 143 filling groove 132 and holes 134. A portion of sealing engagement 141b is molded in place in piston half 128b, with portion 144 filling groove 133 and holes 137. When molded in place, sealing elements 141a and 141b have the configuration seen in the exploded view in FIG. 19.

The upper end portion 136 of piston 128 is configured to receive an inner operating piston, to be described below. The upper end 136 has a pair of longitudinally extending slots 146a and 146b. Piston half 128a has a tongue 162a and groove 163a which mate with groove 163b and tongue 162b, respectively on piston half 128b (FIG. 21).

Figure 17:
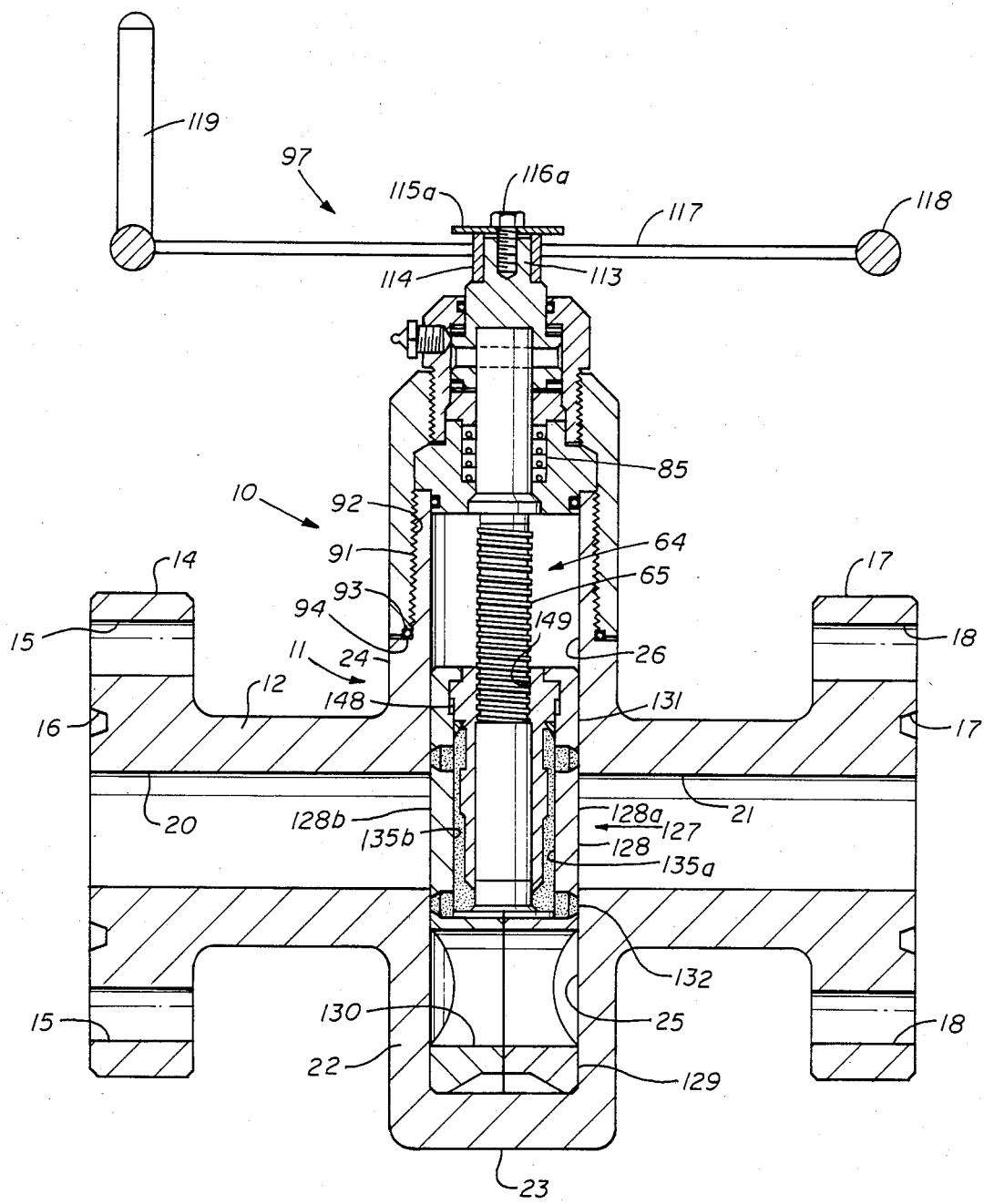
FIG. 17 is a view in longitudinal central section of another embodiment of the high pressure shut-off valve in a valve closed position, having the valve assembly split longitudinally and assembled into a unit, and in which the sealing rubber is molded in two separate parts.

Inner piston 148 is seen in section in FIGS. 17, 18 and 19. Inner piston 148 is tubular and is internally threaded at 149 to receive the threaded portion 65 of valve stem 64. Inner piston 148 has tabs 150a and 150b which fit grooves 146a and 146b in outer piston 128 to restrain the pistons against relative rotary movement. The outer surface of piston 148 includes a groove 154 and stepped surfaces 155 and 156. The lower end portion 157 of piston 148 is slidably guided on a separate cylindrical boss member 158a which rests on wall 164 of piston 128.

The plug valve assembly 127 is assembled by assembling the outer piston halves 128a and 128b around inner piston 148 so that tabs 150a and 150b are positioned in slots or grooves 146a and 146b and the assembly is then secured together by band 160. The assembly is then places in the valve cavity with the valve opening 130 aligned with passages 20 and 21 and secured against rotation out of alignment by the pins which cooperate with grooves 139. When assembled in this manner, the sealing element 141 has the configuration seen in FIGS. 17 and 18. Of course the rubber sealing element is in two separate pieces, molded separately in place as described above. When assembled in this manner, the inner piston 148 is capable of overtravel relative to piston 128 and can compress the rubber sealing material to transmit uniform outward pressure to sealing ring portions 143 and 144 to seal around the valve passages 20 and 21 in the valve closed position. In this embodiment, the portion of piston surface 131 inside grooves 143 and 144 has the same shape and performs the same function as the discs 49 and 50 in the embodiment of FIG. 1.

OPERATION

The valve described above is a forged steel valve of straight through flow design that can be used for stopping the flow of high pressure fluids and gases. Forged alloy steel is preferred in the construction to permit the application of the valve in hostile and corrosive environments. The operation is substantially the same as described for FIGS. 1 and 9, except for the difference in construction of the sealing element.

The valve 10 is shown in FIG. 17 in a closed position. The plug valve assembly 127 is completely lowered until the bottom end portion 129 of outer piston 128 engages the end wall 23 of valve body portion 22.

The valve is normally connected with inlet portion 12 connected to high pressure and outlet portion 13 connected to an outlet line or connection. The valve body is provided with seals against leakage of high pressure fluid at a number of points. O-ring or packing 93, O-rings 76, 77 and 110, and valve stem packing 85 provide for a complete seal against pressure loss through any of the points of assembly of the valve.

In the position shown in FIG. 17, the bottom end portion 129 of outer piston 128 has just contacted the end wall 23 of valve body portion 22. The valve plug assembly 127, including outer piston 128, sealing element 141 and inner piston 148 are moved reciprocally by means of the threaded opening 149 which rides up and down along valve stem 64 on rotation thereof by hand wheel 97. In the position shown, hand wheel 97 has been moving inner piston 148 downward.

In this position, further rotation of hand wheel 97 is possible which will move inner piston 148 downward relative to outer piston 128. This relative movement will cause rubber sealing element 141 to be compressed between the outer surface of piston 148 and the inner surface of piston 128 to press the rubber material uniformly through holes 134 and 137 to apply uniform pressure on sealing ring portions 132 and 133 to press the same to provide a very tight seal against the cylindrical walls 25 and 26 of the valve body 11.

In this position, the valve is being held in a tightly sealed position by application of the inlet pressure to the cavity above the rubber sealing element 141, even though hand wheel 97 has been backed off to the point where further movement will cause seal inner piston 148 to begin to rise along the threaded portion 65 of valve stem 64 to start to move the valve plug assembly toward open position.

In the position shown in FIG. 17, with rubber sealing element 141 held in tight compression, the piston surfaces within grooves 132 and 133 close the valve bore to prevent flow of fluid or gas therethrough and also function to prevent extrusion of rubber sealing element ring portions 143 and 144 into the valve bore.

Rotation of the valve wheel 97 by handle 119 or rim 118 will rotate the valve stem 64 for moving the plug valve assembly 127. Rotation in a clockwise direction moves the plug valve assembly downward toward the closed position shown in FIG. 17 while rotation in a counterclockwise direction moves the plug valve assembly 127 toward the open position shown in FIG. 2. The valve stem 64, and particularly the threaded portion 65 thereof, is a non-rising stem. It is rotated in a fixed position longitudinally as confined by the stem bonnet gland 71, stem adapter 96, bearings 100 and 102, etc.

As hand wheel 97 is rotated in a counterclockwise direction, the threaded portion 65 of valve stem 64 causes piston 148 to move upward. The bore 135 of outer piston 128 provides for movement of the plug valve assembly 127 to a fully opened position, as shown in FIG. 2. As plug valve assembly 127 is moved upward by rotation of valve stem 64, the rubber sealing element 141 is first decompressed and then the engagement with inwardly extending flanges 165a and 165b causes the pistons 128 and 148 to move together toward an open position. Tabs 150a and 150b keep the outer piston 128 from turning relative to inner piston 148 during movement, while the pins cooperating with grooves 139 prevent the plug valve assembly from turning and thus assure alignment of valve piston bore 130 with the valve body bore when moved to a valve open position.

As plug valve assembly 127 is moved upward, plug valve assembly 127 is brought to the position shown in FIG. 2 with outer piston bore 130 in alignment with inlet passage 20 and outlet passage 21 which form the continuous straight, in line bore for the valve body. When the plug valve assembly is moved to a fully opened position, the entire sealing 141 is positioned above the main flow of fluid or gases through the bore of the valve body. The valve assembly is self purging in the open position as a result of the aspirating effect produced by flow of fluids or gases through valve opening 130 along the aperture or opening 138 extending into the bottom of cavity 26.

While this invention has been described fully and completely with special emphasis on several preferred embodiments, it should be understood that, within the scope of the appended claims, the invention may be practiced otherwise than as specifically shown and described herein.

We claim:

1. A high pressure shut-off valve comprising
a hollow valve body having an open end, a closed end and a cylindrical cavity therein,
cover means for said open end,
aligned tubular inlet and outlet portions on opposite sides of said valve body defining a continuous straight bore intersecting said cavity at a right angle thereto,
a plug valve assembly positioned in said cavity and comprising a first piston having a sliding fit in said cavity between an extended position abutting said closed end and a retracted position a predetermined distance therefrom,
said first piston having an end portion with a laterally extending valve passage therethrough and an intermediate portion closing said valve body bore when in said extended position and said valve passage being aligned with said valve body bore when in said retracted position,
said first piston being a hollow piston with a smooth cylindrical surface including said intermediate portion,
said cylindrical surface having circular grooves in diametrically opposed positions defining cylindrical surface portions of a size closing said casing bore when in a retracted position,
a plurality of holes interconnecting each of said circular grooves with the bore of said first piston,
said intermediate portion being radially immovable, having a fixed radius and providing fixed surfaces of cylindrical configuration with a sliding fit in said cavity,
a sealing member of elastomeric material, filling said circular grooves and said holes and including elastomeric material positioned in the bore of said first piston, cooperable with said first piston intermediate portion and movable relative thereto and engaging the entire circumferential wall of said cavity around said bore to seal the same against leakage when closed,
operating means for moving said plug valve assembly between said extended and retracted positions and including means engageable with said sealing member in said extended position to compress the same longitudinally along said first piston to expand the same outward to seal against leakage of pressure around said radially immovable intermediate first piston portion, said engageable means comprising a second piston slidably movable inside first piston and movable, upon movement of said plug valve assembly to a closed position, to a position engaging and compressing the portion of said elastomeric material in said first piston bore to apply substantially uniform pressure of said elastomeric material in said circular grooves against the surface of said valve cavity to seal around said valve cavity bore.

2. A high pressure shut-off valve according to claim 1 in which
said second piston has a stepped surface configuration operable to apply substantially uniform pressure to said elastomeric material in said first piston bore and thus apply substantially uniform pressure on said elastomeric material sealing the surface of said valve cavity around said valve cavity bore when said piston cylindrical surfaces are in position closing said valve cavity bore.

3. A high pressure shut-off valve according to claim 1 in which
said elastomeric material in said grooves and said holes is integral with said elastomeric material in said first piston bore.

4. A high pressure shut-off valve according to claim 1 in which
said elastomeric material in said grooves and said holes is separate from said elastomeric material in said first piston bore.

5. A high pressure shut-off valve according to claim 1 in which
said elastomeric material in said grooves and said holes is molded in a single step integral with said elastomeric material in said first piston bore.

6. A high pressure shut-off valve according to claim 1 in which
said elastomeric material in place in said grooves and said holes and is separately molded on said second piston to provide said elastomeric material in said first piston bore.

7. A high pressure shut-off valve according to claim 1 in which
said first piston is provided in two separate portions divided along a longitudinal dividing line and fitted together around said second piston to produce said plug valve assembly,
said elastomeric material being molded in place in said grooves and said holes on the separate portions of said first piston,
said elastomeric material being separately molded on said second piston to provide said elastomeric material in said first piston bore.

8. A high pressure shut-off valve according to claim 1 in which
said valve assembly operating means comprises a rotatable non-rising threaded operating stem supported in said cover means,
rotary operating means for said stem positioned outside said cover means, and
lost motion connection means including said second piston interconnecting said stem and said plug valve assembly and movable relative thereto to engage and compress said sealing member on movement thereof to said extended position.

9. A high pressure shut-off valve according to claim 8 in which
said rotary operating means comprises a manually operated wheel operatively secured on an end of said operating stem.

10. A high pressure shut-off valve according to claim 1 in which
said valve body has a bleed passage from said bore on the valve body inlet side to a point in said cavity communicating with the space above said sealing member in said extended position to apply valve fluid pressure thereto to maintain said sealing member under pressure.

11. A high pressure shut-off valve according to claim 1 in which
said valve body has a bleed passage from said bore on the valve body inlet side to a point in said cavity communicating with the space above said sealing member in said extended position to apply valve fluid pressure thereto to maintain said sealing member under pressure, and
said first piston has an enlarged end portion with said valve passage therein of a size fitting said cavity for sliding movement therein, and two portions of lesser diameter on which said sealing member is positioned, whereby the upper end of said sealing member has a larger annular end surface area than the lower end thereof.

12. A high pressure shut-off valve according to claim 1 in which
said first piston has a longitudinally extending bore, of a size sufficient to receive said operating stem, extending to a wall portion separating the same from said valve passage, and
a bleed passage from said first piston bore into said valve passage.

13. A high pressure shut-off valve according to claim 12 including
said valve assembly operating means comprises a rotatable non-rising threaded operating stem,
rotary operating means for said stem,
lost motion connection means interconnecting said stem and said plug valve assembly and movable relative thereto to engage and compress said sealing member on movement thereof to said extended position, and
said first piston having an enlarged end portion with said valve passage therein of a size fitting said cavity for sliding movement therein, and two portions of lesser diameter on which said sealing member is positioned, whereby the upper end of said sealing member has a larger annular end surface area than the lower end thereof.

14. A high pressure shut-off valve according to claim 13 in which
said first piston has a longitudinally extending bore, of a size sufficient to receive said operating stem, extending to a wall portion separating the same from said valve passage, and
a bleed passage from said first piston bore into said valve passage.

15. A high pressure shut-off valve according to claim 14 in which
said lost motion connection means comprises a cup shaped member fitting over the open end of said first piston and having a threaded opening in the base wall thereof receiving said operating stem to raise and lower said plug valve assembly on rotation thereof,
said first piston having slots in the wall thereof, and
pins secured in said cup shaped member fitting said first piston slots to permit lost motion therebetween, excessive movement of said cup shaped member toward said extended position causing the same to move relative to said first piston to engage and compress the end of said sealing member.

16. A high pressure shut-off valve according to claim 15 in which
said valve body cover means includes bearing means for said operating stem, and
pressure sealing and packing means sealing said operating stem and said said cover means agaist pressure leakage.

17. A high pressure shut-off valve according to claim 16 in which
said operating stem includes a back sealing flange thereon engageable with part of said cover means upon predetermined movement in said retracted position, and
said cover means including a removable portion permitting access to said bearing and packing means for service and replacement while said valve is connected under pressure.

18. A high pressure shut-off valve according to claim 17 in which
said first piston had longitudinally extending guide slots along opposite sides of the portion in which said valve passage is positioned, and
pins positioned in the wall of said valve body extending into said last named slots to guide the upward and downward movement of said first piston to assure alignment of said valve passage with said valve body bore when in said retracted position.

* * * * *